(12) United States Patent
Li et al.

(10) Patent No.: US 10,211,629 B2
(45) Date of Patent: Feb. 19, 2019

(54) CIRCUITS AND DEVICES RELATED TO OVERCURRENT PROTECTION

(71) Applicant: SKYWORKS SOLUTIONS, INC., Woburn, MA (US)

(72) Inventors: Hai-Bo Li, Wuxi (CN); Wei Jia Yu, Shanghai (CN)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/332,232

(22) Filed: Oct. 24, 2016

(65) Prior Publication Data

US 2017/0040792 A1    Feb. 9, 2017

Related U.S. Application Data

(63) Continuation of application No. 14/287,255, filed on May 27, 2014, now Pat. No. 9,478,977.

(51) Int. Cl.
| | |
|---|---|
| *H02H 3/00* | (2006.01) |
| *H02H 9/02* | (2006.01) |
| *H02H 7/12* | (2006.01) |
| *H02J 7/00* | (2006.01) |
| *H02M 1/32* | (2007.01) |
| *H02H 3/08* | (2006.01) |

(52) U.S. Cl.
CPC ............ *H02H 9/02* (2013.01); *H02H 7/1213* (2013.01); *H02J 7/0016* (2013.01); *H02M 1/32* (2013.01); *H02H 3/08* (2013.01); *Y02B 20/346* (2013.01)

(58) Field of Classification Search
USPC .............................. 361/86–87, 93.7–93.9, 18
See application file for complete search history.

(56) References Cited

U.S. PATENT DOCUMENTS

| | | | |
|---|---|---|---|
| 6,509,721 B1 | 1/2003 | Liebler | |
| 7,068,023 B2 * | 6/2006 | Okada | .................. G05F 1/575 323/285 |
| 9,478,977 B2 | 10/2016 | Li et al. | |
| 2006/0158159 A1 * | 7/2006 | Nishimori | ........... H02M 3/1584 323/222 |
| 2008/0037295 A1 | 2/2008 | Suzuki et al. | |

(Continued)

FOREIGN PATENT DOCUMENTS

| | | |
|---|---|---|
| CN | 201510279179.3 | 5/2015 |
| JP | 2007-159344 A | 6/2007 |
| TW | 104116867.0 | 5/2015 |

*Primary Examiner* — Danny Nguyen
(74) *Attorney, Agent, or Firm* — Chang & Hale LLP

(57) ABSTRACT

Circuits and devices related to overcurrent protection. In some embodiments, a voltage converter can include a voltage converting circuit configured to receive an input voltage and generate an output voltage. The voltage converter can further include an overcurrent protection circuit coupled to the voltage converting circuit and having a detection unit configured to detect an overcurrent condition associated with the voltage converting circuit and generate an overcurrent signal indicative of the overcurrent condition. The overcurrent protection circuit can further include a consumption unit in communication with the detection unit and configured to selectively consume and thereby reduce a current in a path associated with the voltage converting circuit upon receipt of the overcurrent signal.

20 Claims, 6 Drawing Sheets

(56) References Cited

U.S. PATENT DOCUMENTS

| | | | | |
|---|---|---|---|---|
| 2009/0046404 A1* | 2/2009 | Morino | ................... | G05F 1/573 |
| | | | | 361/93.9 |
| 2010/0127678 A1* | 5/2010 | Inatomi | ................... | H02M 1/32 |
| | | | | 323/282 |
| 2013/0093404 A1* | 4/2013 | Park | ....................... | H02M 1/32 |
| | | | | 323/273 |
| 2016/0049861 A1* | 2/2016 | Ihs | ....................... | H02M 3/158 |
| | | | | 323/282 |

* cited by examiner

CIRCUITS AND DEVICES RELATED TO OVERCURRENT PROTECTION

CROSS-REFERENCE TO RELATED APPLICATION(S)

This application is a continuation of U.S. application Ser. No. 14/287,255 filed May 27, 2014, entitled OVERCURRENT PROTECTION DEVICE AND OVERCURRENT PROTECTION METHOD FOR ELECTRONIC MODULES, the benefit of the filing date of which is hereby claimed and the disclosure of which is hereby expressly incorporated by reference herein in its entirety.

TECHNICAL FIELD

The present application relates to a field of electronic circuits, and more particularly, to an overcurrent protection device for electronic modules and a correspond overcorrect protection method.

BACKGROUND

Electronic modules such as a voltage converter, a power amplifier, a monitor or the like exist in various electronic apparatus, such as tablet computers, smart phones, music players etc., and each electronic module has a rated current. When the current flowing in the electronic module exceeds the rated current, the electronic module will be burned out and cannot work. Therefore, it is necessary to set an overcurrent protection device in the electronic module so as to protect the entire electronic module when the current flowing through it is too large.

The various electronic modules require a power source to supply power so that they can work. Conventional overcurrent protection devices can achieve overcurrent protection by disconnecting the electronic module from the power source. However, cutting off the power supply of the electronic module may cause disturbance of its operation, and it is difficult to restart the operation of the electronic module, which may affect operations of other modules or electronic circuits associated with the electronic module.

Moreover, in the conventional overcurrent protection devices, overcurrent protection can also be achieved by controlling an internal current of the electronics module. However, it is difficult to effectively perform overcurrent protection in some cases. Discussion is provided below with the electronic module being a boost converter as example.

The boost converter serves for converting a specific DC input voltage Vin to a larger output voltage Vout so as to supply power to a function module in the electronic apparatus. In the operation process of the boost converter, the input electricity is temporarily stored in an electricity storage element such as an inductor, a capacitor and others (i.e., performing a charging process), and then the electricity is released at an output terminal with different voltages (i.e., performing a discharging process so that the input voltage Vin is converted to the desired output voltage Vout. The boost converter includes a control element such as a switch, and the control element is driven by a driving signal to control the charging and discharging process. When the current in the boost converter is too large, the overcurrent protection device drives the control element to only discharge, not charge, so as to expect a gradual decrease in the current of the storage device in the discharge process.

The overcurrent protection device in the above boost converter can protect the voltage converter well when the output voltage Vout is significantly greater than the input voltage Vin. However, when the output voltage Vout is close to the input voltage Vin, or when the load driven by the boost converter is too heavy and the output voltage Vout is caused to be lower than the input voltage Vin, the current reduction amount on the electricity storage element will be very small, even negative, i.e., it shows as a current increase on the electricity storage element. This can be seen from the following Equation (1)

$$\Delta I_{LD} = -\frac{Vout - Vin}{L} \cdot Toff \quad \text{Equation (1)}$$

where $\Delta I_{LD}$ is a current reduction amount on the electricity storage element, Vout is an output voltage of the boost converter, Vin is an input voltage of the boost converter, L is an inductance value of an inductor that serves as the electricity storage element, and Toff is a turn-off time during which the control element controls the electricity storage element to discharge. It can be known from to Equation (1) that, when the output voltage Vout is close to the input voltage Vin, the current decrease on the electricity storage element current is very small; when the output voltage Vout is lower than the input voltage Vin, the current decrease on the storage device is negative. Therefore, even if the overcurrent protection device detects that the current in the boost converter is too large and turns off the control element to control the current in the boost converter, it is still hard to effectively reduce the current therein so as to perform overcurrent protection on the boost converter. Here, failure of the overcurrent protection device is described with the overcurrent protection device in the boost converter as an example, there are similar problems in electronic modules having a power input such as an amplifier, a monitor etc.

SUMMARY

Aspects of the present application may relate to an overcurrent protection device, an electronic module (e.g., a voltage converter) including the overcurrent protection device, and a method for overcurrent protection.

The electronic module to which the overcurrent protection device of the present application is applied may include: an electricity storage unit for temporarily storing input electricity and being capable of releasing the stored electricity through an electricity transmission path; an electricity storage control unit for controlling storage and release of electricity in the electricity storage unit. The electronic module for example is a boost converter, an amplifier, a monitor etc., the electricity storage unit for example is an inductor in the boost converter, a charge pump in the amplifier etc.

The overcurrent protection device of the present application can detect an overcurrent event that occurs in the electronic module, and enable overcurrent protection when it detects an overcurrent event. When an overcurrent event occurs, the overcurrent protection device of the present application not only can control the electricity storage unit to no longer store the input electricity through the electricity storage control unit, but also set an electricity consumption unit on the electricity transmission path on which the electricity storage unit releases electricity, and use it to consume electricity stored in the electricity storage unit, thereby reducing the current flowing in the electronic module and achieving overcurrent protection. The electricity consumption unit set on the electricity transmission path may be a specifically set resistor, and may also be implemented by an electronic element already existing in the electronic module.

By utilizing the overcurrent protection device of the present application, it is possible to effectively carry out overcurrent protection on the electronic module, rather than being limited by the operation state of the electronic module. For example, even if the output voltage in the boost converter is close to or less than the input voltage, the current in the boost converter can also be reduced effectively, thus implementing overcurrent protection.

BRIEF DESCRIPTION OF THE DRAWINGS

In order to more clearly explain the technical solution, drawings referenced in the description of embodiments or conventional technologies are briefly introduced below. The drawings described below are merely some embodiments of the present invention, a person of ordinary skill in the art can also obtain other drawings according to these drawings. Identical reference numerals typically indicate identical components throughout these drawings.

DETAILED DESCRIPTION

The overcurrent protection device and the electronic module including the overcurrent protection device described herein can be realized in a variety of electronic apparatuses, which may include, but not are limited to, an electronic product, a portion of an electronic product, an electronic test equipment etc. The electronic product may include, but is not limited to, a smart phone, a TV, a tablet computer, a monitor, a personal digital assistant, a camera, an audio player, a memory etc. A portion of the consumer electronic product may include a multi-chip module, a power amplifier module, a voltage converter etc.

Figure 1:
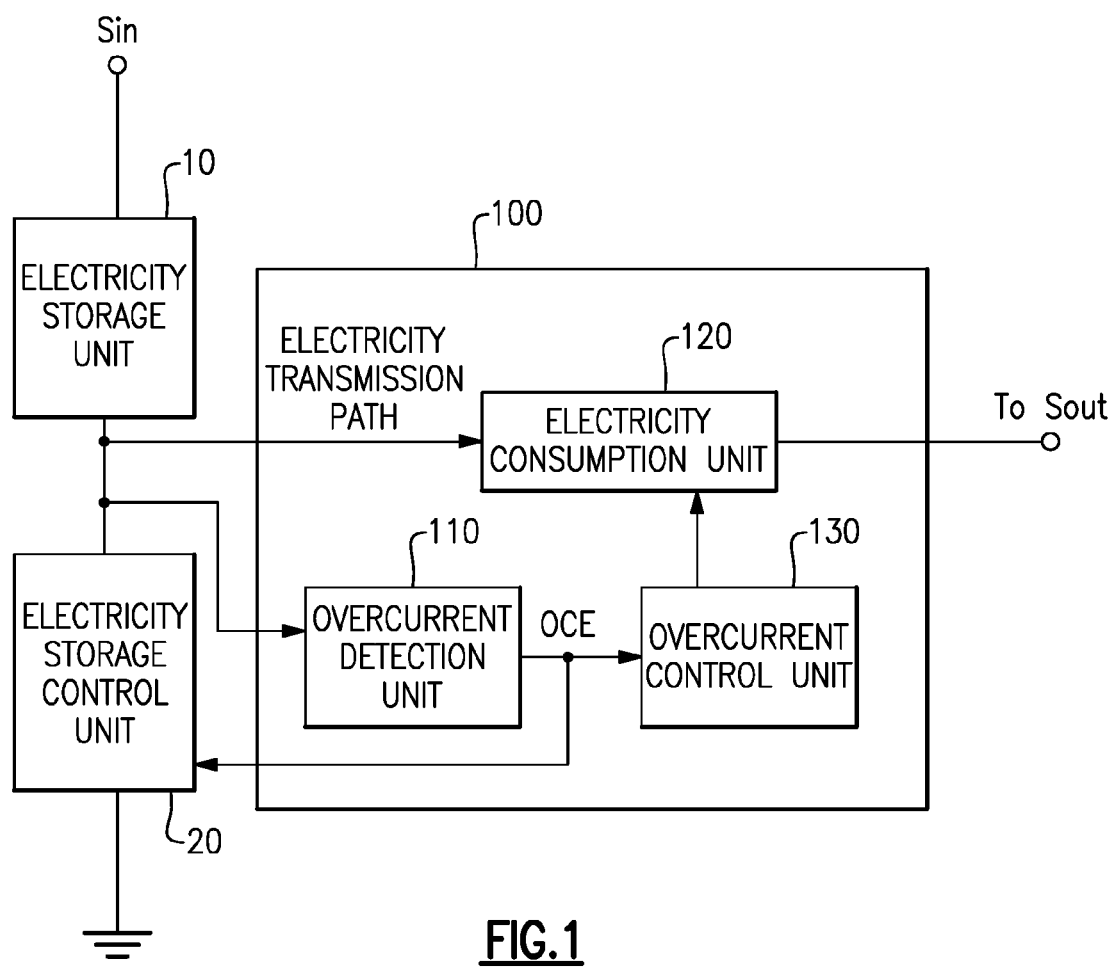
FIG. 1 schematically illustrates a block diagram of the overcurrent protection device in the present application.

FIG. 1 schematically illustrates a block diagram of the overcurrent protection device 100 in the present application.

As shown in FIG. 1, an electronic module to which the overcurrent protection device 100 is applied may include: an electricity storage unit 10 for temporarily storing input electricity and being capable of releasing the stored electricity through an electricity transmission path; an electricity storage control unit 20 for controlling a storage and a release of electricity in the electricity storage unit 10. The electronic module including the electricity storage unit 10 and the electricity storage control unit 20 for example is a boost converter, an amplifier etc. The power transmission path is a path on which the electricity of the electricity storage unit 10 is released. As an example, in the voltage converter, the power transmission path is a path between the electricity storage unit 10 and a port of outputting voltage, and the port of outputting voltage serves for supplying power to load of the voltage converter; in the amplifier, the electricity transmission path is a circuit path connected with an output of a charge pump. The boost converter, amplifier, etc. provided herein are merely examples of the electronic module to which the overcurrent protection device is applied, any electronic module including an electricity storage unit and an electricity storage control unit may adopt the overcurrent protection device in the present application.

The electricity storage control unit 20 controls the electricity storage unit 10 to receive input electricity from an input terminal Sin and temporarily store the input electricity in the electricity storage unit 10, correspondingly, the current that flows through the electricity storage unit 10 increases gradually; thereafter, the electricity storage control unit 20 controls the electricity storage unit 10 to release the stored electricity through the electricity transmission path. Thus, when accumulation of electricity is excessive in the electricity storage unit 10, the output current will be extremely large, which will destroy the electricity storage unit 10, the electricity storage control unit 20, and other electronic elements connected with the electricity storage unit 10 in the electricity transmission path. The electricity storage unit 10 for example is an inductor in the boost converter, a charge pump in the amplifier etc., and the electricity storage control unit 20 for example is a control switch in the boost converter, a control element for controlling the charge pump in the amplifier etc.

In FIG. 1, only units or sections in the electronic module that are directly associated with overcurrent protection device 100 are illustrated. In practice, the electronic module may also include other units or sections, for example, the voltage converter may further include a feedback unit for performing feedback control based on an output voltage, a voltage stabilizing unit for stabilizing the output voltage, and a driving unit for driving the electricity storage control unit 20 etc. Units or sections included by an individual electronic module will vary depending on a different function of the electronic module.

As shown in FIG. 1, the overcurrent protection device 100 of the present application may include: an overcurrent detection unit 110 for determining whether an overcurrent event occurs in the electronic module, outputting an overcurrent indication signal OCE indicative of whether an overcurrent event occurs, and supplying the overcurrent indication signal OCE to the electricity storage control unit 20 so as to control the electricity storage unit 10 to release electricity when an overcurrent event occurs; an electricity consumption unit 120 removably connected in the electricity transmission path and consuming electricity that passes through the electricity transmission path while being connected in the electricity transmission path; an overcurrent control unit 130 for controlling connection of the electricity consumption unit 120 in the electricity transmission path based on the overcurrent indication signal OCE.

The overcurrent detection unit 110 can for example detect a current output from the electricity storage unit 10 of the electronic module, and determine whether an overcurrent event occurs in the electronic module by comparing the current output from the electricity storage unit 10 with a preset current threshold. Typically, when the current output from the electricity storage unit 10 is greater than or equal to the preset current threshold, it is determined that an overcurrent event occurs in the electronic module; when the current output from the electricity storage unit 10 is less than the preset current threshold, it is determined that no overcurrent event occurs in the electronic module. Alternatively, the overcurrent detection unit 110 can also detect voltage in the electricity transmission path, and determine whether an overcurrent event occurs in the electronic module by comparing the detected voltage with a preset voltage threshold. Various ways may be adopted for different electronic modules to determine whether an overcurrent event occurs therein, specific determination ways do not constitute a limitation to the embodiments of the present application.

The electricity consumption unit 120 can be outside the electricity transmission path when no overcurrent event occurs, and be connected in the electricity transmission path to consume electricity when an overcurrent event occurs. As an example, the electricity consumption unit may be a resistor, a load that consumes electricity, and so on. Any element that consumes electricity may be used as the electricity consumption unit 120.

When the overcurrent indication signal OCE output by overcurrent detection unit 110 indicates that an overcurrent event occurs, the overcurrent detection unit 110 supplies the overcurrent indication signal OCE to the electricity storage control unit 20 to control the electricity storage unit 10 to release electricity and no longer receive more electricity from the input terminal Sin.

When the overcurrent indication signal OCE output by overcurrent detection unit 110 indicates that an overcurrent event occurs, the overcurrent control unit 130 controls to connect the electricity consumption unit 120 in the electricity transmission path in order to consume electricity and thereby avoid a continued increase of the current output by the electricity storage unit, and accordingly protect the electricity storage unit 10 and the electricity storage control unit 20 and electronic elements in the electricity release path from being destroyed. For example, the overcurrent control unit 130 may control to attach the electricity consumption unit 120 in the electricity transmission path as a bypass unit, such that when no overcurrent event occurs, current of the electricity storage unit 10 directly passes through the electricity transmission path without passing through the electricity consumption unit 120, and when an overcurrent event occurs, the electricity consumption unit 120 is made to reside in the electricity transmission path to consume electricity.

In the overcurrent protection device 100 described in conjunction with FIG. 1, when an overcurrent event occurs, as compared with a configuration where only the electricity storage unit 10 no longer stores the input electricity in the conventional technology, the electricity consumption unit is further provided on the electricity transmission path where the electricity storage unit 10 releases electricity, and electricity stored in the electricity storage unit 10 is consumed by using the electricity consumption unit, which gradually reduces the current flowing in the electronic module and thereby achieves overcurrent protection.

Figure 2:
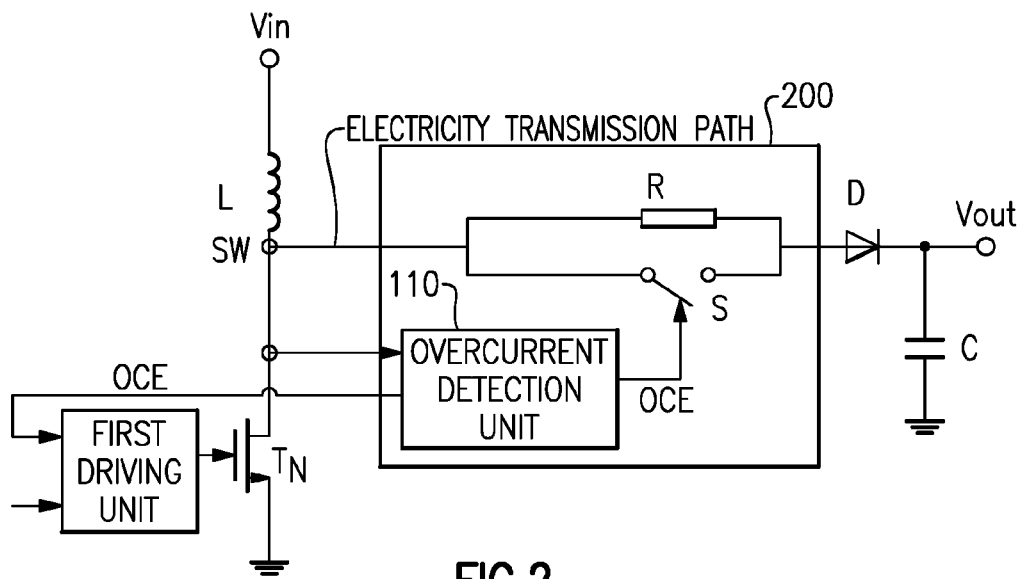
FIG. 2 schematically illustrates an application example of the overcurrent protection device of the present application in an asynchronous boost converter.

FIG. 2 schematically illustrates an application example of the overcurrent protection device 200 of the present application in an asynchronous boost converter. FIG. 2 shows the overcurrent protection device 200 in the present application and a device in the asynchronous boost converter and connected with the overcurrent protection device 200.

As shown in FIG. 2, the electricity storage unit 10 in FIG. 1 is formed by using an inductor L connected to a port that inputs voltage Vin. A triode $T_N$ and a first driving unit for the triode $T_N$ are used as an electricity storage control unit 20 for controlling the inductor L. The electricity transmission path having a diode D thereon is formed between the inductor L and a port that outputs voltage Vout. Further, the asynchronous boost converter further includes a capacitor C used for stably outputting the output voltage Vout.

During a charging process, the triode $T_N$ is turned on under control of the first driving unit, i.e., a short circuit is formed between the inductor L and the ground to produce current. The diode D is turned off because voltage at its input is lower than voltage at its output, i.e., an open circuit is formed between a connection point (i.e., point SW in FIG. 2) of the inductor L and the triode $T_N$ and the port that outputs voltage, and the capacitor C is prevented from discharging to ground. Since the input voltage Vin is a direct current, induction current in the inductor L increases at a constant rate, and as the induction current increases, electricity is stored in the inductor L.

During a discharging process, the triode $T_N$ is turned off under control of the first driving unit, i.e., an open path is formed between the inductor L and the ground; the diode D is turned on because the voltage at its input is higher than voltage at its output, i.e., a short circuit is formed between the point SW in FIG. 2 and the port that outputs voltage. Because of a holding characteristic of the induction current, the current that passes through the inductor L will slowly decrease from a value when the charging is completed, until a next charging process starts or the current value drops to zero. The voltage between two ends of the capacitor C increases, and boosting conversion is achieved.

A resistor R and a switch S of the overcurrent protection device 200 in FIG. 2 correspond to the electricity consumption unit 120 and the overcurrent control unit 130 of the overcurrent protection device 100 in FIG. 1, respectively. That is to say, the electricity consumption unit 120 and the overcurrent control unit 130 in FIG. 1 are implemented by using the resistor R and the switch S, respectively.

As shown FIG. 2, the overcurrent protection device 200 comprises: an overcurrent detection unit 110 for determining whether an overcurrent event occurs in the electronic module based on the current in the inductor L (e.g., current at the point SW in FIG. 2), outputting an overcurrent indication signal OCE indicating whether an overcurrent event occurs, and supplying the overcurrent indication signal OCE to the first driving unit to control the inductor L to discharge via the triode $T_N$; a resistor R removably connected in the electricity transmission path and consuming electricity that passes through the electricity transmission path while being connected in the electricity transmission path; a switch S for opening when the overcurrent indication signal OCE indicates that an overcurrent event occurs, and connecting the resistor R in the electricity transmission path to consume electricity. Further, when the overcurrent indication signal OCE indicates that no overcurrent event occurs, the switch S is closed, and a short circuit is formed thereby excluding the resistor R from the electricity transmission path.

Figure 3:
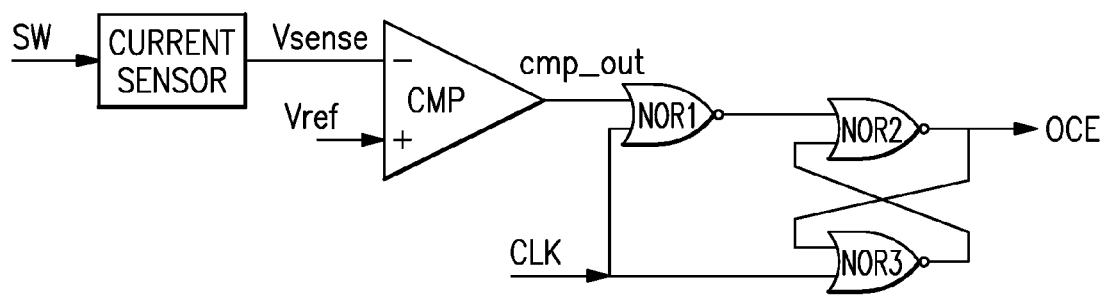
FIG. 3 schematically illustrates a circuit diagram of an overcurrent detection unit in the overcurrent protection device in FIG. 2.

FIG. 3 schematically illustrates a circuit diagram of an overcurrent detection unit 110 in the overcurrent protection device 200 in FIG. 2. As shown in FIG. 3, current at the point SW in FIG. 2 is sensed by a current sensor, and converted to a sensed voltage Vsense to be output. The sensed voltage Vsense is compared with a preset reference voltage Vref by a comparator CMP, and then logical operations are performed on a comparison result of the comparator CMP and a clock signal CLK by using three "NOR" gates NOR1, NOR2, NOR3, so as to obtain the overcurrent indication signal OCE. When the sensed voltage Vsense is less than the reference voltage Vref, an overcurrent signal OCE which is a high signal is output when the clock signal CLK is at a rising edge to indicate that no overcurrent event occurs; when the sensed voltage Vsense is greater than or equal to the reference voltage Vref, an overcurrent indication signal OCE which is a low signal is output when the clock signal CLK is at a rising edge to indicate that an overcurrent event occurs. As described above, different modes may be adopted for different electronic modules to determine whether an overcurrent event occurs therein, and specific determination ways do not constitute a limitation to the embodiments of the present application.

When the overcurrent indication signal OCE output by overcurrent detection unit 110 indicates that an overcurrent event occurs, the overcurrent indication signal OCE is supplied to the first driving unit, which drives the triode $T_N$ to control the inductor L to release electricity and no longer receive more electricity from the input terminal, and to control the switch S to open and connect the resistor R in the electricity transmission path in order to consume electricity and thereby avoid a continued increase of the current output by the inductor L, and accordingly protect the inductor L, the triode $T_N$, the diode D, and the load powered by the output voltage \Tout from being destroyed. Here, the resistor R is only schematic, a light emitting element or the like may also be employed as the electricity consumption unit, thus prompting occurrence of an overcurrent event while consuming electricity.

When the overcurrent indication signal OCE output by overcurrent detection unit 110 indicates that no overcurrent event occurs, the first driving unit normally drives the triode $T_N$ to control the inductor L to discharge or charge, the switch S is in a closed state, and correspondingly the two ends of the resistor R is made a short circuit, so that the resistor R is excluded from the electricity transmission path in the boost converter, and the normal operation of the boost converter will not be affected.

In the overcurrent protection device 200 described in conjunction with FIG. 2, when an overcurrent event occurs, as compared with a configuration where only the inductor L is controlled to no longer store the input electricity in the conventional technology, the resistor R is further provided on the electricity transmission path where the inductor L releases electricity, and electricity stored in the electricity storage unit 10 is also consumed by the resistor R. In this case, even if the output voltage in the boost converter is close to or less than the input voltage, the resistor R can also be used to effectively reduce the current in the boost converter and achieve overcurrent protection.

Figure 4:
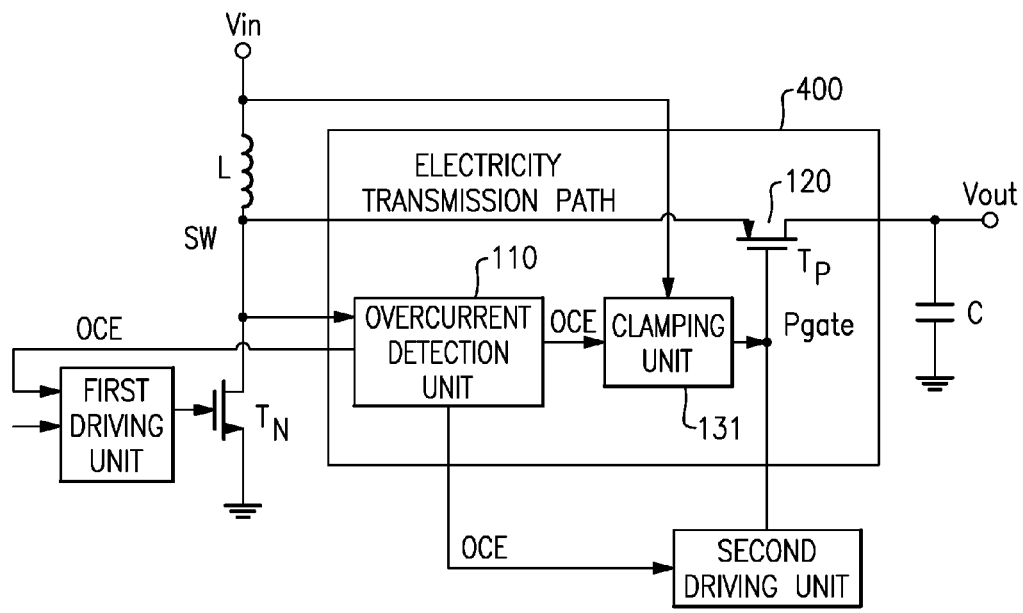
FIG. 4 schematically illustrates an application example of overcurrent protection device of the present application in a synchronous boost converter.

FIG. 4 schematically illustrates an application example of overcurrent protection device of the present application in a synchronous boost converter. FIG. 4 shows the overcurrent protection device 400 in the present application and an element in the synchronous boost converter which is connected to the overcurrent protection device 400.

The inductor L, the triode $T_N$, the first driving unit for the triode $T_N$, and the capacitor C in the synchronous boost converter in FIG. 4 are the same as the inductor L, the triode $T_N$, the first driving unit for the triode $T_N$, and the capacitor C in the asynchronous booster converter in FIG. 2, respectively. The synchronous boost converter in FIG. 4 differs from the asynchronous boost converter in FIG. 2 in that: the diode D in FIG. 2 is replaced with the triode $T_p$ in FIG. 4, and the triode $T_p$ is driven by a second driving unit, which serves for generating a high signal or a low signal to cause the triode $T_N$ to turn on or turn off. In addition, the overcurrent protection device 400 in FIG. 4 also differs in operation as described herein from the overcurrent protection device 200 in FIG. 2.

The charging process and the discharging process of the synchronous boost converter in FIG. 4 are similar to those of the asynchronous boost converter in FIG. 2, respectively, which are briefly described below.

During a charging process, the triode $T_N$ is turned on under control of the first driving unit, i.e., a short circuit is formed between the inductor L and the ground to produce induction current, and the triode $T_p$ is turned off under driving of the second driving unit to yield an open path formed between the inductor L and a port that outputs the voltage Vout. Since the input voltage Vin is a direct current, induction current in the inductor L increases at a constant rate, and as the induction current increases, electricity is stored in the inductor L.

During a discharging process, the triode $T_N$ is turned off under control of the first driving unit, i.e., an open path is formed between the inductor L and the ground, and the triode $T_p$ is turned on under driving of the second driving unit, i.e., a short circuit is formed between the inductor L and a port that outputs the voltage Vout. Because of the holding characteristic of the induction current, the current that passes through the inductor L will slowly decrease from a value when the charging is completed, and the voltage between two ends of the capacitor C increases correspondingly, that is, boosting conversion is achieved.

A clamping unit 131 of the overcurrent protection device 400 in FIG. 4 corresponds to the overcurrent control unit 130 of the overcurrent protection device 100 in FIG. 1. In addition, in FIG. 4, the electricity consumption unit 120 is not specifically set in the overcurrent protection device 400. Instead the triode $T_p$ in the synchronous boost converter is used for consuming electricity in the electricity transmission path when an overcurrent event occurs. That is to say, the electricity consumption unit 120 and the overcurrent control unit 130 in FIG. 1 correspond to the triode $T_p$ and the clamping unit 131 in the overcurrent protection device 400 of FIG. 4, respectively. In FIG. 4, the triode $T_N$ is an N-type triode, the triode $T_p$ is a P-type triode, which are just examples. Other types of triode may be used as the triodes $T_N$ and $T_p$, the specific type of each triode does not constitute a limitation to the embodiments of the present application.

As shown in FIG. 4, the overcurrent protection device 400 may include: an overcurrent detection unit 110 for determining whether an overcurrent event occurs in the synchronous boost converter based on the current in the inductor L (e.g., current at point SW in FIG. 4), outputting an overcurrent indication signal OCE indicating whether an overcurrent event occurs, and supplying the overcurrent indication signal OCE to the first driving unit to control the inductor L to discharge via the triode $T_N$; a triode $T_p$ whose source and drain are connected in the electricity transmission path, and whose gate is connected to a second driving unit; a clamping unit 131 for clamping the gate of the triode $T_p$ at a predetermined voltage when the overcurrent indication signal OCE indicates that an overcurrent event occurs and thereby increasing a resistance value of the triode $T_p$ so as to consume the electricity in the electricity transmission path. The predetermined voltage may be the input voltage Vin, or a predetermined value smaller than the input voltage Vin. When the overcurrent indication signal OCE indicates that no overcurrent event occurs, the clamping unit 131 does not clamp the gate of the triode $T_p$, and the triode $T_p$ operates normally as a triode in the synchronous boost converter. The overcurrent detection unit 110 in FIG. 4 is the same as that described in the above in conjunction with FIGS. 1-3, and thus no details are repeated here.

Figure 5:
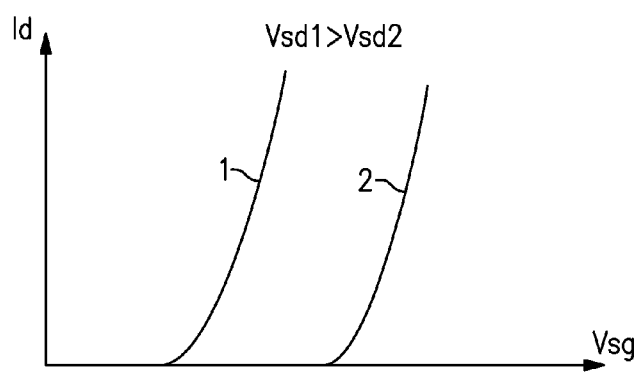
FIG. 5 illustrates a schematic diagram of the relationship between a gate-source voltage of the of triode and a drain current thereof in FIG. 4.

Principle of clamping the gate of the triode $T_p$ at the predetermined voltage to increase the resistance value of the triode $T_p$ will be described below in conjunction with FIG. 5. FIG. 5 illustrates a schematic diagram of the relationship between a gate-source voltage Vsg of the triode $T_p$ and a drain current Id thereof in FIG. 4.

In FIG. 5, horizontal axis represents the source-gate voltage Vsg of the triode $T_p$, longitudinal axis represents the drain current Id thereof. Curves 1 and 2 in FIG. 5 show the source-gate voltage Vsg and the drain current Id when the source-drain voltage Vsd are at Vsd1 and Vsd2 (Vsd1 is greater than Vsd2), respectively. When the gate of the triode $T_p$ is clamped at the predetermined voltage, the gate voltage of the transistor is promoted, the source-gate voltage Vsg decreases, the source-drain voltage Vsd at the same drain current Id increases, and correspondingly, the resistance value of the triode $T_p$ increases.

It can be seen from the illustration of FIG. 5 that, when the predetermined voltage at which the gate (i.e., point Pgate in FIG. 4) of the triode $T_p$ is clamped varies, i.e. the clamping voltage varies, the resistance value of the triode $T_p$ changes correspondingly. The higher the clamping voltage is, the greater the resistance value of the triode $T_p$ is; the lower the clamping voltage is, the smaller the resistance value of the triode $T_p$ is. When the resistance value of the triode $T_p$ s large, overcurrent protection can be achieved quickly.

In order to facilitate the achievement, the gate of the triode $T_p$ may be clamped at the input voltage Vin of the synchronous boost converter, and in such a configuration, it is not necessary to provide other supply voltages to the synchronous boost converter. In addition, the gate of the triode $T_p$ may be clamped at a preset voltage lower than the input voltage Vin.

Figures 6A, 6B:
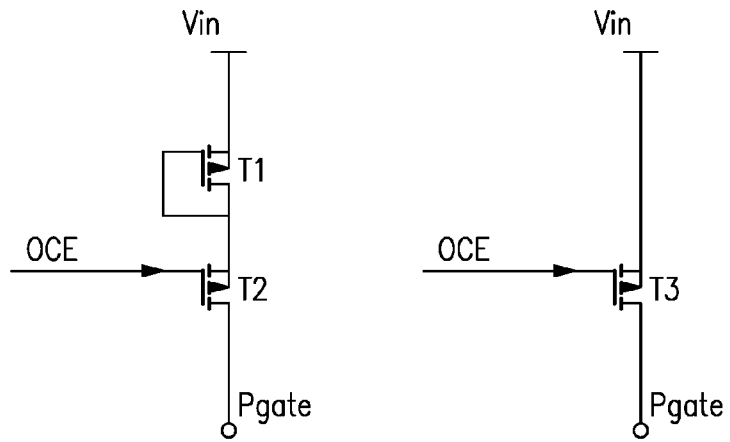
FIGS. 6(a) and 6(b) schematically illustrate a circuit diagram of a clamping unit in the overcurrent protection device shown in FIG. 4.

FIGS. 6(a) and 6(b) schematically illustrate a circuit diagram of the clamping unit 131 in the overcurrent protection device shown in FIG. 4.

In FIG. 6(a), the clamping unit 131 includes series-connected triodes T1 and T2, wherein the source of the triode T1 is connected to the input voltage Vin, the gate of the triode T1 is connected to its drain, and connected to the source of the triode T2, the drain of the triode T2 is connected to the gate (point Pgate in FIG. 4) of the triode $T_p$, i.e., drain voltage of the triode T2 is equal to gate voltage Vg of the triode $T_p$, and the gate of the triode T2 is turned on or turned off under the driving of the overcurrent indication signal OCE. When the overcurrent indication signal OCE is enabled, the triode T2 is turned on, the source-gate voltage Vsg of the triode T1 is equal to its source-drain voltage Vsd, the gate voltage Vg of the triode $T_p$ is equal to the input voltage Vin minus the source-gate voltage Vsg of triode T1. When the overcurrent indication signal OCE is disabled, the triode T2 is turned off, an open circuit is formed between the gate of the triode $T_p$ and the input voltage Vin, so as to not clamp the gate voltage of the triode $T_p$.

In FIG. 6(b), the clamping unit 131 includes a triode T3, whose source is connected to the input voltage Vin and whose drain is connected to the gate of the triode $T_p$, the gate of the triode T3 can be turned on or turned off under the driving of the overcurrent indication signal OCE. When the overcurrent indication signal OCE is enabled, the triode T3 is turned on, the drain voltage of the triode T3 is equal to the input voltage Vin, i.e., the gate voltage Vg of the triode $T_p$ is clamped at the input voltage Vin. When the overcurrent indication signal OCE is disabled, the triode T3 is turned off, an open path is formed between the gate of the triode $T_p$ and the input voltage Vin, so as to not clamp the gate voltage of the triode $T_p$.

The second driving unit may be made to output a high level consistently while the clamping unit 131 clamps the gate voltage of the triode $T_p$, in this case, the clamping voltage of the gate of the triode $T_p$ will be affected by the high level output by the second driving unit. Alternatively, the second driving unit may be made to disconnect the gate of the triode $T_p$, so as to clamp the gate voltage Vg of the triode $T_p$ at a desired voltage.

As an example of disconnecting the second driving unit with the gate of triode $T_p$, it is possible to set a switch driven by using the overcurrent indication signal OCE between the traditional second driving unit and the gate of the triode $T_p$. When the overcurrent OCE signal indicates that no overcurrent event occurs, the switch is in a closed state, the second driving unit drives the triode $T_p$ to turn on or turn off in the traditional way; when the overcurrent indication signal OCE indicates an overcurrent event occurs, the OCE overcurrent indication signal drives the switch to open, so that an open path is formed between the second driving unit and the gate of the triode $T_p$. Alternatively, the second driving unit may be also made to present a high impedance with respect to the gate of the second triode when the overcurrent indication signal OCE indicates that an overcurrent event occurs, which will be described in conjunction with FIG. 7.

Figure 7:
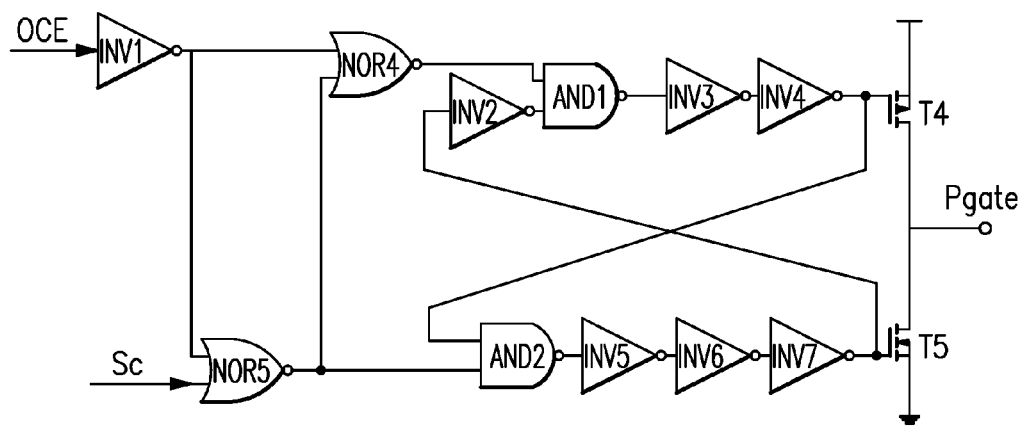
FIG. 7 schematically illustrates a circuit diagram of a second driving unit in the overcurrent protection device shown in FIG. 4.

FIG. 7 schematically illustrates a circuit diagram of a second driving unit in the overcurrent protection device shown in FIG. 4. In FIG. 7, the second driving unit receives the overcurrent indication signal OCE and a control signal Sc for instructing the triode $T_p$ to turn on or turn off. Inverters (INV1-INV7), "NOR" gates (NOR4, NOR5), AND gates (AND1, AND2) are used for performing logic operations on the overcurrent indication signal OCE and the control signal Sc, and a driving signal is output through a triode T4 and a triode T5. FIG. 7 shows specific example of a connection relationship. When the overcurrent indication signal OCE indicates that no overcurrent event occurs, the triode T4 and the triode T5 in FIG. 7 output 0 or 1 under control of the control signal Sc, for example, when the triode T4 turns off and the triode T5 turns on under action of the control signal Sc, the second driving unit in FIG. 7 outputs a driving signal "0" to cause the triode $T_p$ to turn off; when the triode T4 turns on and the triode T5 turns off under action of the control signal Sc, the second driving unit in FIG. 7 outputs a driving signal "1" to turn on the triode $T_p$. When the overcurrent indication signal OCE indicates that an overcurrent event occurs, both the triode T4 and triode T5 in FIG. 7 turn off under action of the overcurrent indication signal OCE, output of the second driving unit is a high impedance, which does not affect the clamping voltage at the gate of triode $T_p$.

In addition, the synchronous boost converter may also adopt the structure of the overcurrent protection device 200 shown in FIG. 2. In this case, the second driving unit drives the triode $T_p$ in a conventional manner, the overcurrent detection unit 110 supplies the overcurrent indication signal OCE to the switch S to control whether to consume electricity on the electricity transmission path by the resistor R.

Figure 8:
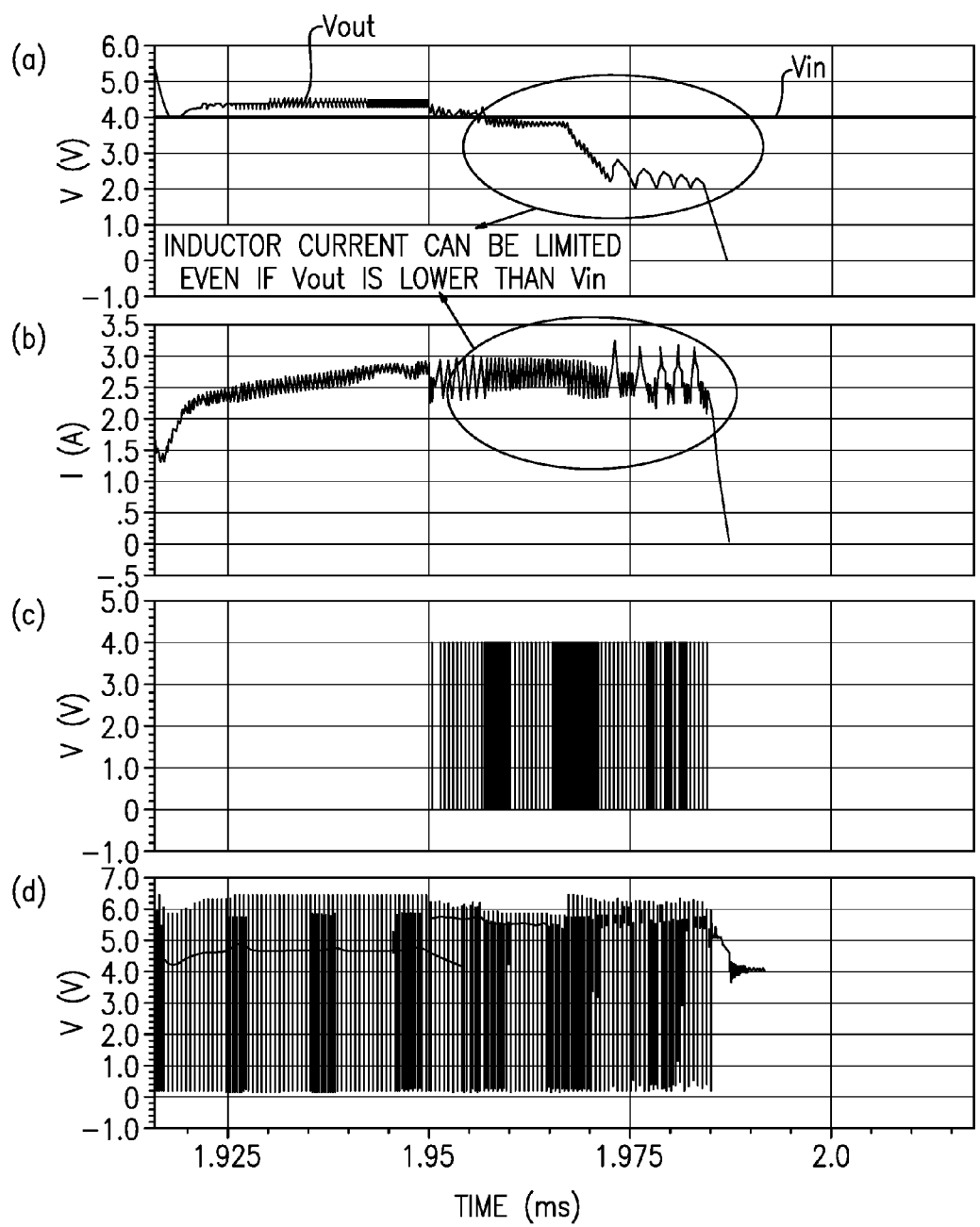
FIG. 8 illustrates a schematic waveform of performing overcurrent protection by the overcurrent protection device in FIG. 4 in the synchronous boost converter.

FIG. 8 illustrates a schematic waveform of performing overcurrent protection by the overcurrent protection device in FIG. 4 in the synchronous boost converter. In FIG. 8, horizontal axis represents time, longitudinal axis in FIG. 8(a) represents voltage, and FIG. 8(a) shows curves of the input voltage Vin and the output voltage \Tout; longitudinal axis in FIG. 8(b) represents current, and FIG. 8(b) shows a curve of current of a load supplied by the output voltage Vout; longitudinal axis of FIG. 8(c) represents voltage of the overcurrent indication signal OCE output by the overcurrent detection unit 110, wherein when the overcurrent indication signal OCE appears as a low value, it indicates that an overcurrent event occurs; longitudinal axis of FIG. 8(d) represents voltage, and FIG. 8(d) shows a curve of voltage at the point SW in FIG. 4, which reflects a switching frequency of the synchronous boost converter. As can be seen, when an overcurrent event occurs as the input voltage Vin is close to the output voltage Vout, the output voltage Vout and load current can be reduced effectively by the overcurrent protection device of the present application, thus overcurrent protection is achieved (as shown by the ellipse blocks in FIGS. 8(a) and 8(b)).

From the description provided above with reference to FIGS. 4-8 it can be known that, when an overcurrent event occurs, as compared with a configuration where only the inductor L is controlled to no longer store the input electricity in the conventional technology, an existing triode of the synchronous boost converter is also used for forming an electricity consumption element to consume electricity stored in the inductor L in the electricity transmission path. Even if the output voltage in the synchronous boost converter is close to or less than the input voltage, the electricity consumption element formed by the triode can also be used for effectively reducing the current in the boost converter and achieve overcurrent protection.

Figure 9:
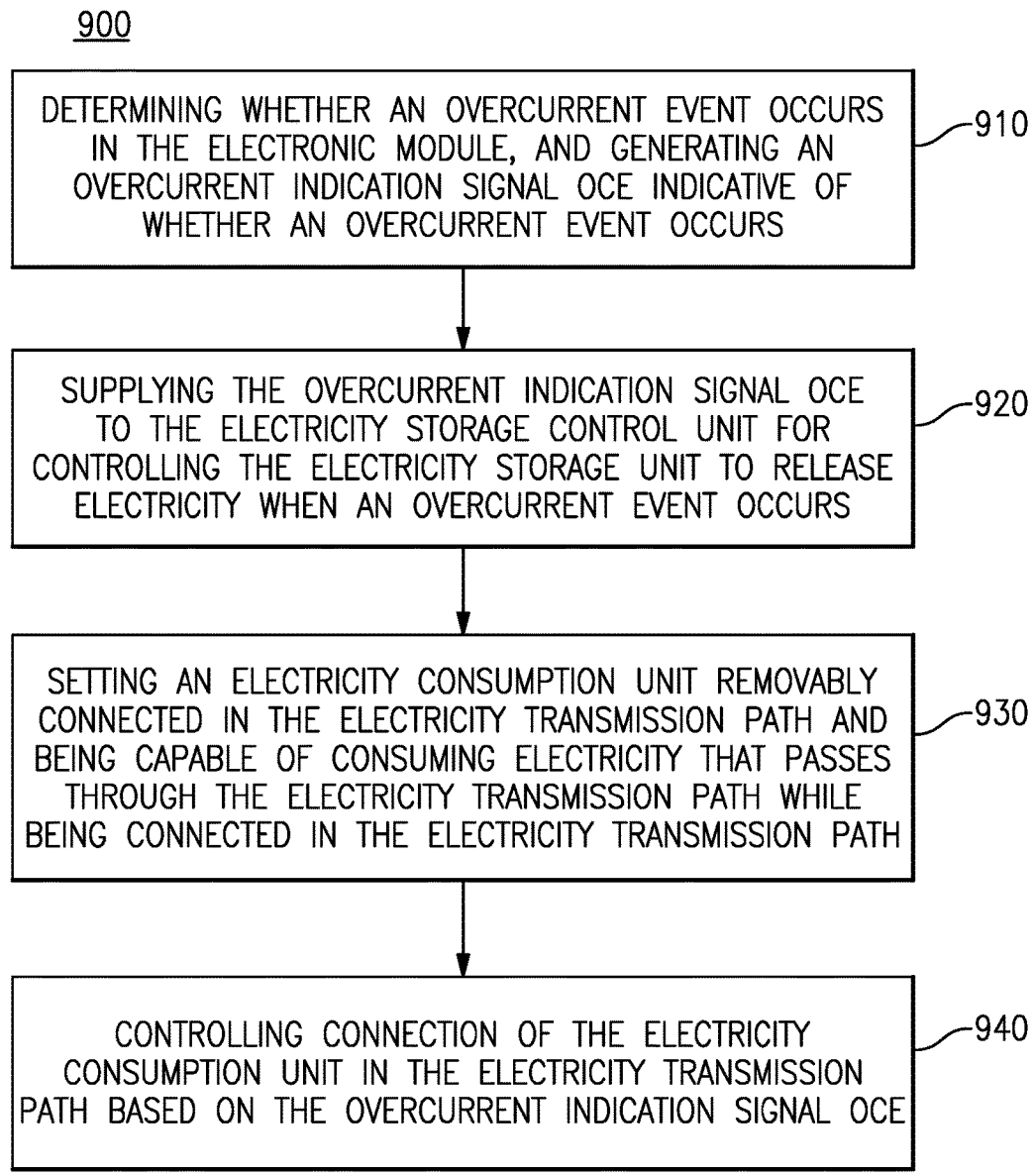
FIG. 9 illustrates a flowchart of an exemplary overcurrent protection method in the present application.

FIG. 9 illustrates a flowchart of an example overcurrent protection method 900 in the present application. The overcurrent protection method 900 may be used for the electronic module as follows and electronic apparatus including the electronic module. The electronic module may include: an electricity storage unit for temporarily storing input electricity and capable of releasing the stored electricity through an electricity transmission path; and an electricity storage control unit for controlling storage and release of electricity in the electricity storage unit. The electronic module for example is a voltage converter, an amplifier, a monitor, etc., and any electronic module including the electricity storage unit and the electricity storage control unit may adopt the overcurrent protection device of the present application. In addition, the electronic module may also include other units or sections, for example, the voltage converter may further include a feedback unit for performing feedback control based on an output signal, a voltage stabilizing unit for stabilizing an output voltage, and a driving unit for driving the electricity storage control unit etc.

As shown in FIG. 9, the overcurrent protection method 900 for the electronic module may comprise: determining whether an overcurrent event occurs in the electronic module, and generating an overcurrent indication signal OCE indicative of whether the overcurrent event occurs (S910); supplying the overcurrent indication signal OCE to the electricity storage control unit for controlling the electricity storage unit to release electricity when the overcurrent event occurs (S920); setting an electricity consumption unit removably connected in the electricity transmission path and capable of consuming electricity that passes through the electricity transmission path while being connected in the electricity transmission path (S930); and controlling connection of the electricity consumption unit in the electricity transmission path based on the overcurrent indication signal OCE (S940).

When the overcurrent indication signal OCE generated in S910 indicates that an overcurrent event occurs, the electricity storage control unit controls the electricity storage unit to release electricity and no longer receive more electricity in S920, the power consumption unit is connected in the electricity transmission path in S930 and S940 in order to consume electricity, thereby avoiding a continued increase of the current output by the electricity storage unit, and accordingly protect the electricity storage unit and the electricity storage control unit and electronic elements in the electricity release path from being destroyed.

In S930 a resistor may be provided in the electricity transmission path as the electricity consumption unit, with a switch connected in parallel with the resistor being set therein, change of the operating state of the switch can cause the resistor to reside in the electricity transmission path or be excluded from the electricity transmission path. In particular, when the overcurrent indication signal OCE indicates that an overcurrent event occurs, the switch connected in parallel with the resistor is opened in S940, correspondingly, the resistor resides in the electricity transmission path to consume electricity; when the overcurrent indication signal OCE indicates that no overcurrent event occurs, the switch in parallel with the resistor is closed in S940 to form a short circuit, the resistor is excluded from the power transmission path.

Further, in the case that there is a triode (e.g., the triode $T_p$ in FIG. 4) in the electricity transmission path, the electricity consumption unit may be implemented by using the triode in S930, without the need to set an electricity consumption unit specifically. Accordingly, in S940, the gate of the triode in the electricity transmission path is clamped at a high voltage, so that the triode presents resistive properties, and consumes electricity in the electricity transmission path. The high voltage may be the input voltage in the boost converter or a predetermined voltage lower than the input voltage. For more flexibility clamping the gate of the triode at a desired high voltage, the gate of the triode may be disconnected with its driving signal when an overcurrent event occurs. Disconnection of the gate of the triode and its driving signal may be implemented via a switch, or may also be implemented by causing the driving unit for generating the driving signal to generate a high output impedance.

In the overcurrent protection method of the present application, when an overcurrent event occurs, the electricity consumption unit is further provided on the electricity transmission path where the electricity storage unit releases electricity, and electricity stored in the electricity storage unit is also consumed by the electricity consumption unit, thus reducing the current flowing through the circuit module and achieving overcurrent protection. Even if the output voltage in the boost converter is close to or less than the input voltage, the electricity consumption unit can also be used for effectively reducing the current in the boost converter and achieving efficient overcurrent protection.

In the various examples described herein, references are made to triodes. It will be understood that such triodes can include transistors such as field-effect transistors (FETs). Such FETs can include, for example, MOSFET devices and/or transistors implemented in other process technologies. Other types of transistors can be utilized to implement one or more features of the present disclosure.

Those skilled in the art can understand, for convenience and simplicity of the description, as for specific implementations of the method embodiments described above, corresponding process in the preceding product embodiments can be implemented.

Those with ordinary skill in the art can appreciate that, devices and algorithm steps described with reference to the embodiments disclosed in this document may be implemented through electronic hardware, or a combination of the electronic hardware and software. As for each specific application, a person skilled in the art can use different methods to implement the described functions, but such implementations should not be construed as being beyond the scope of the present invention.

Principles and advantages of technical solutions described above are applicable to any system and module that require overcurrent protection. The system and module having the overcurrent protection can be realized in a variety of electronic apparatuses, which may include, but are not limited to, an electronic product, a portion of an electronic product, an electronic test equipment etc. The consumer electronic product may include, but is not limited to, a smart phone, a TV, a tablet computer, a monitor, a personal digital assistant, a camera, an audio player, a memory etc. A portion of the consumer electronic product may include a multi-chip module, a power amplifier module, a voltage converter etc.

The above described are only specific implementations of the present technical solution, but the scope of the present technical solution is not limited thereto, and any alternatives and equivalents that can be conceivable by a person skilled in the art should be encompassed within the scope of protection of the present technical solution.

What is claimed is:

1. A voltage converter comprising:
a voltage converting circuit configured to receive an input voltage and generate an output voltage; and
an overcurrent protection circuit including a detection unit configured to detect an overcurrent condition associated with the voltage converting circuit, the overcurrent protection circuit further including a consumption unit implemented along an electricity transmission path of the voltage converting circuit and configured to provide a first resistance when there is no overcurrent condition and a second resistance during the overcurrent condition, the second resistance greater than the first resistance, such that the consumption unit selectively provides an increased resistance along the electricity transmission path during the overcurrent condition.

2. The voltage converter of claim 1 wherein the detection unit is further configured to generate an overcurrent signal indicative of the overcurrent condition, and the consumption unit is configured to provide the second resistance when the overcurrent signal is present, and provide the first resistance when the overcurrent signal ceases.

3. The voltage converter of claim 2 wherein the consumption unit is configured to consume substantially none of a current passing through the electricity transmission path when the overcurrent signal ceases.

4. The voltage converter of claim 1 wherein the electricity transmission path is an output path of the voltage converting circuit.

5. The voltage converter of claim 4 wherein the detection unit is configured to detect the overcurrent condition based on a current through an inductor associated with the voltage converting circuit.

6. The voltage converter of claim 5 wherein the detection unit is further configured to provide the overcurrent signal to a first driving unit of the voltage converting circuit to cease charging operation and to perform discharging operation while the overcurrent condition exists.

7. The voltage converter of claim 5 wherein the detection unit includes a current sensor configured to generate a sensed voltage based on the current through the inductor.

8. The voltage converter of claim 7 wherein the detection unit further includes a comparator configured to compare the sensed voltage with a reference voltage to provide a comparator-output signal.

9. The voltage converter of claim 8 wherein the detection unit further includes a logic circuit configured to combine the comparator-output signal and a clock signal to provide the overcurrent signal, the overcurrent signal being substantially synchronized with the clock signal.

10. The voltage converter of claim 4 wherein the consumption unit includes a switchable resistance configured to provide the first resistance when there is no overcurrent condition and the second resistance during the overcurrent condition.

11. The voltage converter of claim 10 wherein the first resistance includes a resistance associated with the output path during normal operation when there is no overcurrent condition.

12. The voltage converter of claim 10 wherein the switchable resistance includes a parallel combination of a resistor and a switch implemented along the output path, the switch configured to be in an open state during the overcurrent condition to allow the resistor to consume at least some of a current in the output path, the switch further configured to be in a closed state when there is no overcurrent condition.

13. The voltage converter of claim 10 wherein the voltage converting circuit is configured to operate as an asynchronous boost converter.

14. The voltage converter of claim 4 wherein the consumption unit includes a transistor configured to provide a first resistance when there is no overcurrent condition and a second resistance during the overcurrent condition.

15. The voltage converter of claim 14 wherein the overcurrent protection circuit further includes a clamping unit configured to control the transistor to provide the second resistance during the overcurrent condition.

16. The voltage converter of claim 14 wherein the voltage converting circuit is configured to operate as a synchronous boost converter.

17. A method for converting voltage, the method comprising:
receiving an input voltage and generating an output voltage;
detecting an overcurrent condition associated with the generating of the output voltage; and
controlling a consumption unit along an electricity transmission path associated with the generating of the output voltage to provide a first resistance when there is no overcurrent condition and a second resistance during the overcurrent condition, the second resistance greater than the first resistance, such that the consumption unit selectively provides an increased resistance along the electricity transmission path during the overcurrent condition.

18. The method of claim 17 wherein the consumption unit consumes substantially nil amount of current when there is no overcurrent condition.

19. A portable electronic device comprising:
a module configured to provide one or more functionalities for the portable electronic device, and to utilize a regulated voltage; and
a voltage converter configured to provide the regulated voltage, the voltage converter including a voltage converting circuit configured to receive an input voltage and generate the regulated voltage as an output voltage, the voltage converter further including an overcurrent protection circuit including a detection unit configured to detect an overcurrent condition associated with the voltage converting circuit, the overcurrent protection circuit further including a consumption unit implemented along an electricity transmission path of the voltage converting circuit and configured to provide a first resistance when there is no overcurrent condition and a second resistance during the overcurrent condition, the second resistance greater than the first resistance, such that the consumption unit selectively provides an increased resistance along the electricity transmission path during the overcurrent condition.

20. The portable electronic device of claim 19 wherein the portable device includes a mobile phone, a tablet computer, a display, an eBook reader, or a portable digital media display.

* * * * *